May 14, 1935.    J. B. CROCKETT    2,001,125
MANUFACTURE FROM RUBBER LATEX OF RUBBER ARTICLES CARRYING IMPRINTS
Filed June 25, 1929
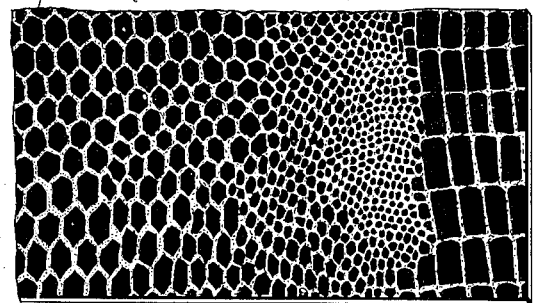
Imprinted fibers embedded in rubber sheet and transferred from printed fibrous base on which the rubber latex was deposited and dried.
Dried and, if desired, vulcanized rubber latex sheet.
Inventor
James Barret Crockett
by Wright, Brown, Quinby May
attys.

Patented May 14, 1935

2,001,125

UNITED STATES PATENT OFFICE 2,001,125

MANUFACTURE FROM RUBBER LATEX OF RUBBER ARTICLES CARRYING IMPRINTS

James Barret Crockett, Cambridge, Mass.

Application June 25, 1929, Serial No. 373,686

9 Claims. (Cl. 41—33)

This invention relates to the manufacture of rubber articles, such as rubber sheeting, carrying imprints of an ornamental or other character thereon, through the use of rubber latex as the raw material for forming or moulding such articles. More specifically, the articles of the present invention carry thereon imprints which have been transferred thereto from suitable backings, on which the imprints were originally made with suitable transferable printing media, the transfer being made coincidently with the formation or moulding of the articles, and, if desired, with the vulcanization thereof.

It is one of the objects of the invention to provide a simple and inexpensive method of forming a rubber sheet or backing and taking off during the operation on one surface of the sheet a reproduction of printed or inked matter originally impressed or made upon paper, wood, metal or other material.

A preferred method is to flow rubber latex over a printed surface, for example, newsprint. The latex is allowed to dry in contact with the printed surface after which it is removed with the printed matter imprinted on the contacted surface of the rubber sheet.

Prevulcanized latex is suitable and a vulcanizable latex that is, latex containing vulcanizing ingredients may also be used and the term latex as herein used is meant to include latex either natural, and unvulcanized or vulcanized in suspension or latex containing vulcanizing ingredients which will effect vulcanization during or after drying at normal or elevated temperatures. Such vulcanized or vulcanizable latex may also include fillers, pigments, etc. and may be employed in any desirable concentration.

In carrying out the invention, the printed surface to be reproduced, for instance, newsprint, may be laid upon a support and the latex flowed, brushed, sprayed, or spread over the same and allowed to dry at normal or elevated temperatures. When the latex has dried, the resulting rubber sheet or backing formed is stripped from the printed surface and washed to remove any surplus adhering parts of the newsprint and to bring out the printed design now transferred on the formed rubber sheet. Vulcanization if necessary or desired may be effected conveniently before stripping.

In transferring from paper newsprint and other similar fibrous material it has been found in practice that not only is the ink or other imprinting medium transferred, but a large amount of the individual fibres of the original backing. These printed fibres become thoroughly incorporated with the latex in the transfer method thereby producing a printed surface on the rubber sheet which combines the ink and some of the original fibres treated by the ink. This results in a soft and leathery finish and an extremely durable and permanent surface design on the rubber sheet which will resist erasure or smearing under any ordinary conditions of use or handling.

Such a printed or patterned rubber sheet has a number of useful purposes, as a novel sheet rubber for any of the uses to which sheet rubber is put or in forming rubber articles with a novel finish, for instance, a bathing shoe or cap with an alligator or serpent design, the design being transferred from printing on a soft wood form or from newsprint pasted onto a dipping form and the rubber backing deposited by dipping the printed mould in the latex.

I have illustrated on the accompanying drawing an article embodying the present invention, the article shown being a sheet of rubber formed directly from rubber latex by drying and, if desired, vulcanizing the latex. As indicated by the legends on the drawing, the surface of the sheet carries fibers embedded therein, which fibers bear an imprint which has been transferred from a printed fibrous base on which the rubber sheeting was formed by applying fluent rubber latex directly thereto and drying it thereon and then removing or stripping the dried latex deposit from the fibrous base, for instance, a printed paper base. The particular imprint thus produced on the rubber sheeting illustrated on the drawing is one simulating the surface appearance or skin side of reptile skins, such as alligator skin, but it is obvious that the imprint may be of any desired character, as already indicated. The fibrous surface bearing the imprint imparts, as already stated, a soft and leathery feel to the surface of the rubber sheeting and, inasmuch as the fibers are embedded in the rubber, they are resistant to removal, and accordingly, tend to retain the imprint thereon under ordinary conditions of use or handling.

What I claim is:—

1. A method which consists in applying rubber latex to a printed surface of a fibrous material, drying the latex in applied position, and stripping the dried latex from the fibrous material, thereby taking off the printing medium and many of the fibres of the material embedded in the latex.

2. A method which comprises applying rubber latex to a printed paper surface, drying the latex in applied position, and stripping the dried latex from the material, thereby taking off the printing medium and many of the fibers of the paper embedded in the latex.

3. A method which comprises applying a rubber latex composition that can be vulcanized to a printed paper surface, drying and vulcanizing the composition in applied position, and stripping the dried vulcanized latex from the paper, thereby taking off the printing medium and many of the fibers of the paper embedded in the latex.

4. As an article of manufacture, a rubber article consisting of dried rubber latex surfaced with fibers embedded in the body of such latex and carrying an ink imprint thereon.

5. As an article of manufacture, a rubber article consisting of dried and vulcanized rubber latex surfaced with fibers embedded in the body of such latex and carrying an ornamental ink imprint thereon.

6. In the manufacture directly from rubber latex of a rubber article carrying an imprint, those steps which comprise applying fluent rubber latex containing vulcanizing ingredients in direct contact with a printed base, drying and vulcanizing the latex in applied position to form an adherent vulcanized ruber body on said base, and stripping said rubber body carrying added superficial material, including the transferred imprint, from the base.

7. In the manufacture directly from rubber latex of a rubber article carrying an imprint, those steps which comprise associating with the base over which the latex is to be applied an imprint consisting of a transferable printing medium, applying fluent rubber latex to the base in direct contact with said imprint, drying the latex so applied, and removing the resulting rubber deposit carrying added superficial material, including the transferred imprint, from the base.

8. In the manufacture directly from rubber latex of a rubber article carrying an imprint, those steps which comprise applying fluent rubber latex in direct contact with a printed porous base, drying the latex in applied position, and stripping the dried latex carrying added superficial material, including printing medium, from the base.

9. In the manufacture directly from rubber latex of a rubber article carrying an imprint, those steps which comprise applying fluent rubber latex in direct contact with a printed, porous, fibrous base, drying the latex in applied position, and stripping the dried latex carrying added superficial material, including printing medium, from the base.

JAMES BARRET CROCKETT.